United States Patent
Gibeau et al.

(10) Patent No.: US 10,761,183 B2
(45) Date of Patent: Sep. 1, 2020

(54) ULTRASONIC SIGNAL TRIANGULATION

(71) Applicant: Ford Global Technologies, LLC, Dearborn, MI (US)

(72) Inventors: John Paul Gibeau, Canton, MI (US); Mark J. Ferrel, Brighton, MI (US); Christopher W. Bell, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 16/037,515

(22) Filed: Jul. 17, 2018

(65) Prior Publication Data

US 2020/0025864 A1     Jan. 23, 2020

(51) Int. Cl.

| | | |
|---|---|---|
| *G01S 5/22* | (2006.01) | |
| *G05D 1/02* | (2020.01) | |
| *E21C 27/24* | (2006.01) | |
| *B62D 6/04* | (2006.01) | |
| *B62D 5/00* | (2006.01) | |
| *G08B 23/00* | (2006.01) | |
| *B62K 27/06* | (2006.01) | |
| *G01S 15/931* | (2020.01) | |
| *B62D 15/02* | (2006.01) | |
| *B60W 30/06* | (2006.01) | |
| *G01S 5/30* | (2006.01) | |

(52) U.S. Cl.
CPC ............... *G01S 5/22* (2013.01); *B60W 30/06* (2013.01); *B62D 15/0285* (2013.01); *G01S 5/30* (2013.01); *G01S 15/931* (2013.01); *G01S 2015/938* (2013.01)

(58) Field of Classification Search
CPC .. G01S 5/22; G05D 1/02; E21C 27/24; B62D 6/04; B62D 5/00; G08B 23/00; B60K 27/06
See application file for complete search history.

(56) References Cited

U.S. PATENT DOCUMENTS

| | | | | |
|---|---|---|---|---|
| 3,669,209 | A * | 6/1972 | Brooke | B62D 1/28 180/168 |
| 4,155,594 | A * | 5/1979 | Hartley | E21C 35/08 250/254 |
| 5,377,106 | A * | 12/1994 | Drunk | G05D 1/0255 180/169 |
| 9,862,271 | B2 * | 1/2018 | Brankovi | A61B 5/0507 |
| 2006/0037806 | A1 * | 2/2006 | Kasahara | B62D 5/003 180/402 |
| 2011/0133914 | A1 | 6/2011 | Griffin et al. | |
| 2015/0051793 | A1 * | 2/2015 | Lee | B62D 6/04 701/41 |
| 2015/0151641 | A1 | 6/2015 | Berger et al. | |
| 2015/0336462 | A1 | 11/2015 | Bell | |

\* cited by examiner

*Primary Examiner* — Yuri Kan
(74) *Attorney, Agent, or Firm* — David Kelley; Brooks Kushman P.C.

(57) ABSTRACT

A system for a vehicle includes a trio of ultrasonic sensors, and a controller configured to, responsive to a location of an object identified from a distance between the ultrasonic sensors, a receive time at each of the ultrasonic sensors associated with a same ultrasonic pulse from a transmitter of the object, and an absence of data regarding a send time of the ultrasonic pulse, steer the vehicle to the object.

17 Claims, 7 Drawing Sheets

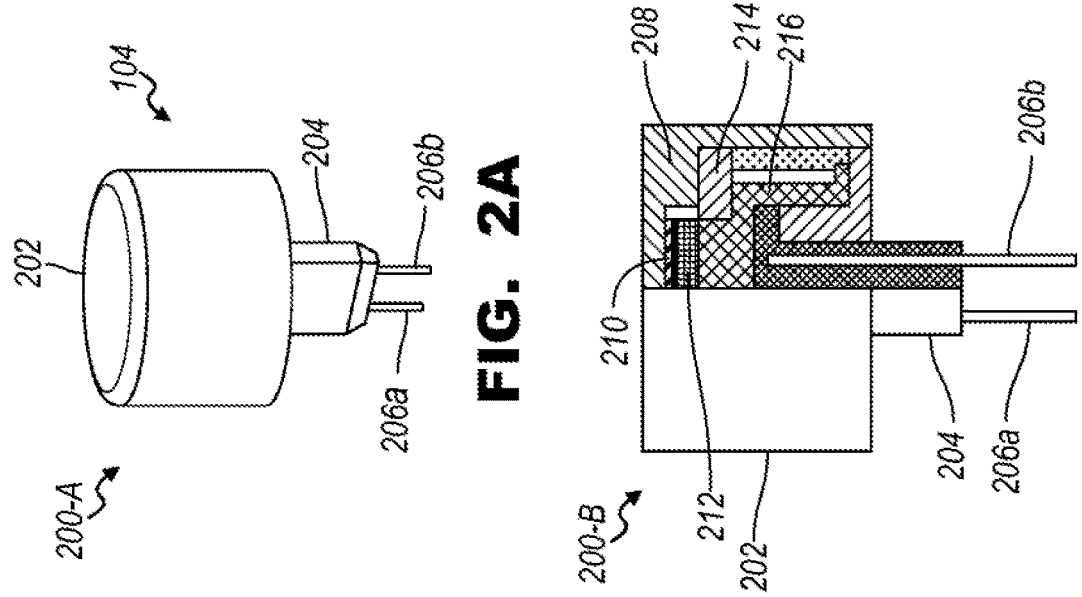
FIG. 2A
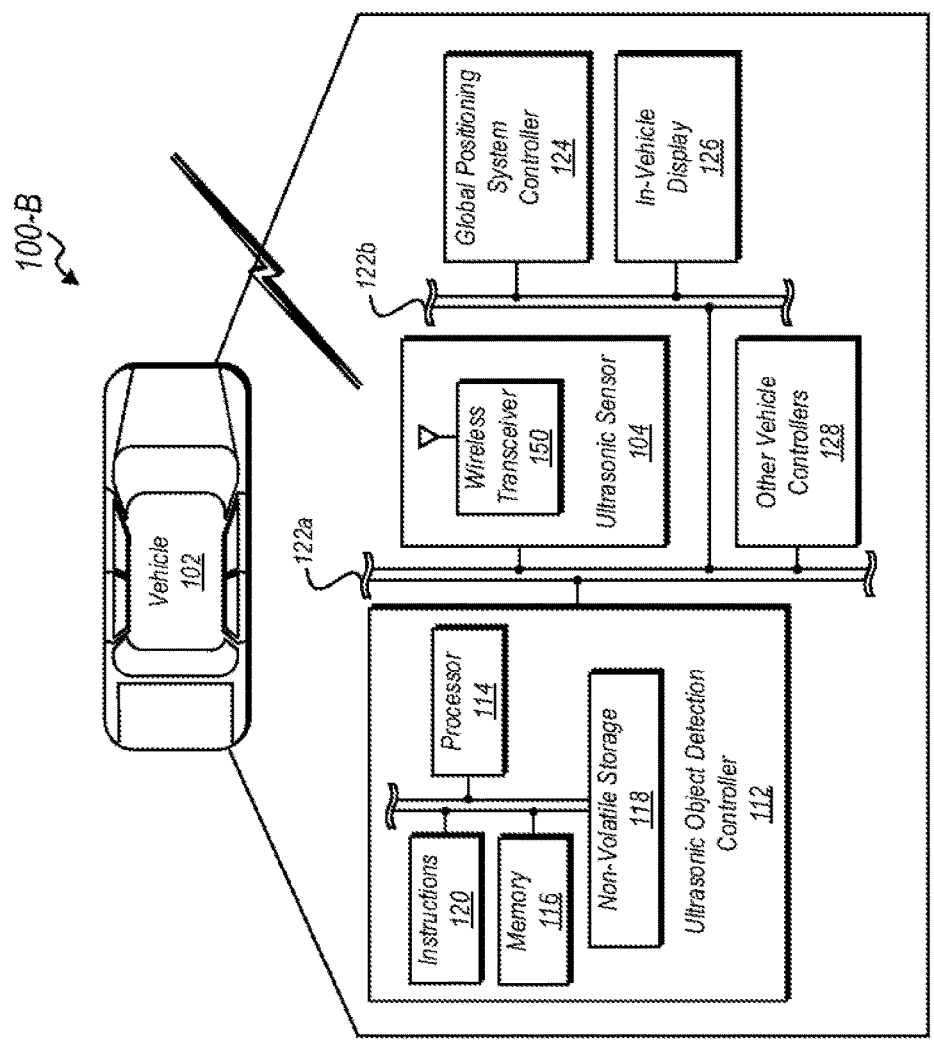
FIG. 2B
FIG. 1B

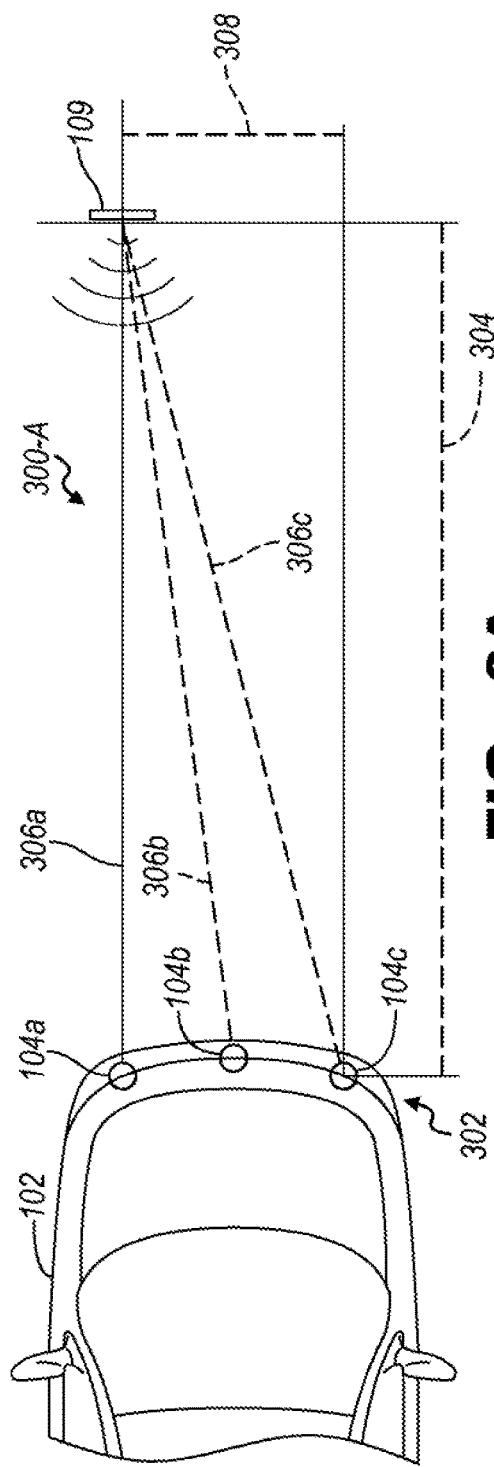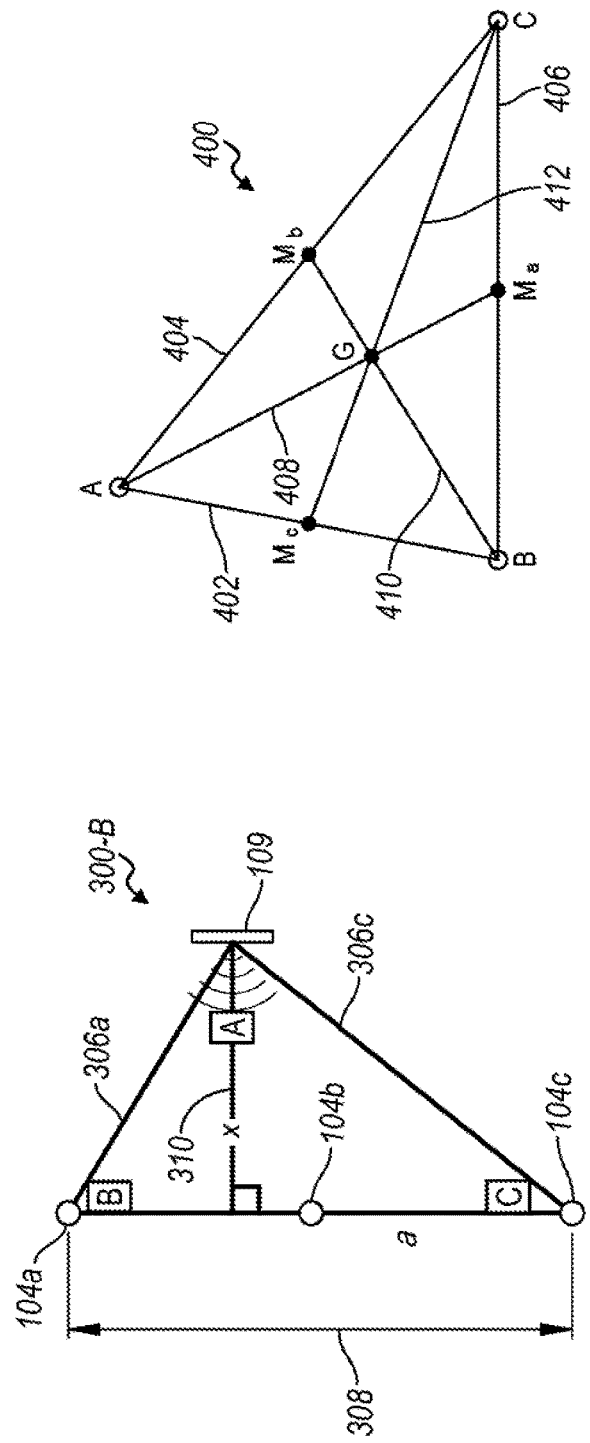

ULTRASONIC SIGNAL TRIANGULATION

TECHNICAL FIELD

The present disclosure relates to systems and methods for locating an object using ultrasonic signal triangulation.

BACKGROUND

Operation of a motor vehicle may include being aware of multiple external factors, such as stationary and moving objects, people, and animals, traffic signals, roadway signage, and so on. As some examples, the external factors may include parked and moving vehicles, bicyclists, pedestrians, one-way street and speed limit signs, and so on. Additionally or alternatively, driving may include maneuvering the vehicle in physically constrained areas or in areas with poor visibility.

One or more vehicle object-detection systems, such as radio detection and ranging (RADAR) and light detection and ranging (LIDAR), may be used to detect objects external to the vehicle. In some instances, RADAR and LIDAR systems may be configured to detect external objects, or "targets", in the vicinity of the vehicle. The vehicle object-detection systems may determine a distance to the external object, i.e., a target range, and speed at which the object is moving toward or away from the vehicle, i.e., a target range rate. The vehicle object-detection systems may be configured to determine a likelihood of collision between the vehicle and the external object.

SUMMARY

A system for a vehicle includes a trio of ultrasonic sensors, and a controller configured to, responsive to a location of an object identified from a distance between the ultrasonic sensors, a receive time at each of the ultrasonic sensors associated with a same ultrasonic pulse from a transmitter of the object, and an absence of data regarding a send time of the ultrasonic pulse, steer the vehicle to the object.

A method for a vehicle includes steering, by a controller, the vehicle to an object responsive to a location of the object identified from a distance between an outer pair of a plurality of ultrasonic sensors on the vehicle, a receive time at each of the ultrasonic sensors associated with a same ultrasonic pulse from a transmitter of the object, and an absence of data regarding a send time of the ultrasonic pulse.

A vehicle includes a bumper having sensors thereon, and a controller configured to steer the vehicle to an object based on a location of the object identified from receive times at each of the sensors associated with a same pulse emitted from the object and an absence of data regarding a send time of the pulse.

BRIEF DESCRIPTION OF THE DRAWINGS

FIG. 1B is a block diagram illustrating a component arrangement of the ultrasonic object detection system;

FIG. 2A is a perspective view of an ultrasonic object detection sensor;

FIG. 2B is a cross-section view of the ultrasonic object detection sensor;

FIG. 3A a block diagram illustrating object positioning using the ultrasonic sensor;

FIG. 3B is a block diagram illustrating ultrasonic sensor object positioning using triangulation;

FIG. 4 is a block diagram illustrating an example geometric triangulation approach;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle object-detection systems may detect objects external to the vehicle using radio waves, light waves, or some combination thereof. In some examples, vehicles may be equipped with an ultrasonic object-detection system. Operating parameters of a given vehicle object-detection system may include a horizontal field of view spanning a predefined horizontal range, e.g., between twenty-five and twenty-seven degrees, and a vertical field spanning a predefined vertical range, e.g., approximately seven degrees. An operation cycle time of each object-detection system may last a predefined time period, such as, several milliseconds, and may vary based on sensor types. In one example, an ultrasonic sensor may employ three beams and may be configured to operate at a range of zero to ten meters, with an effective detection range of one to eight meters.

Figure 1A:
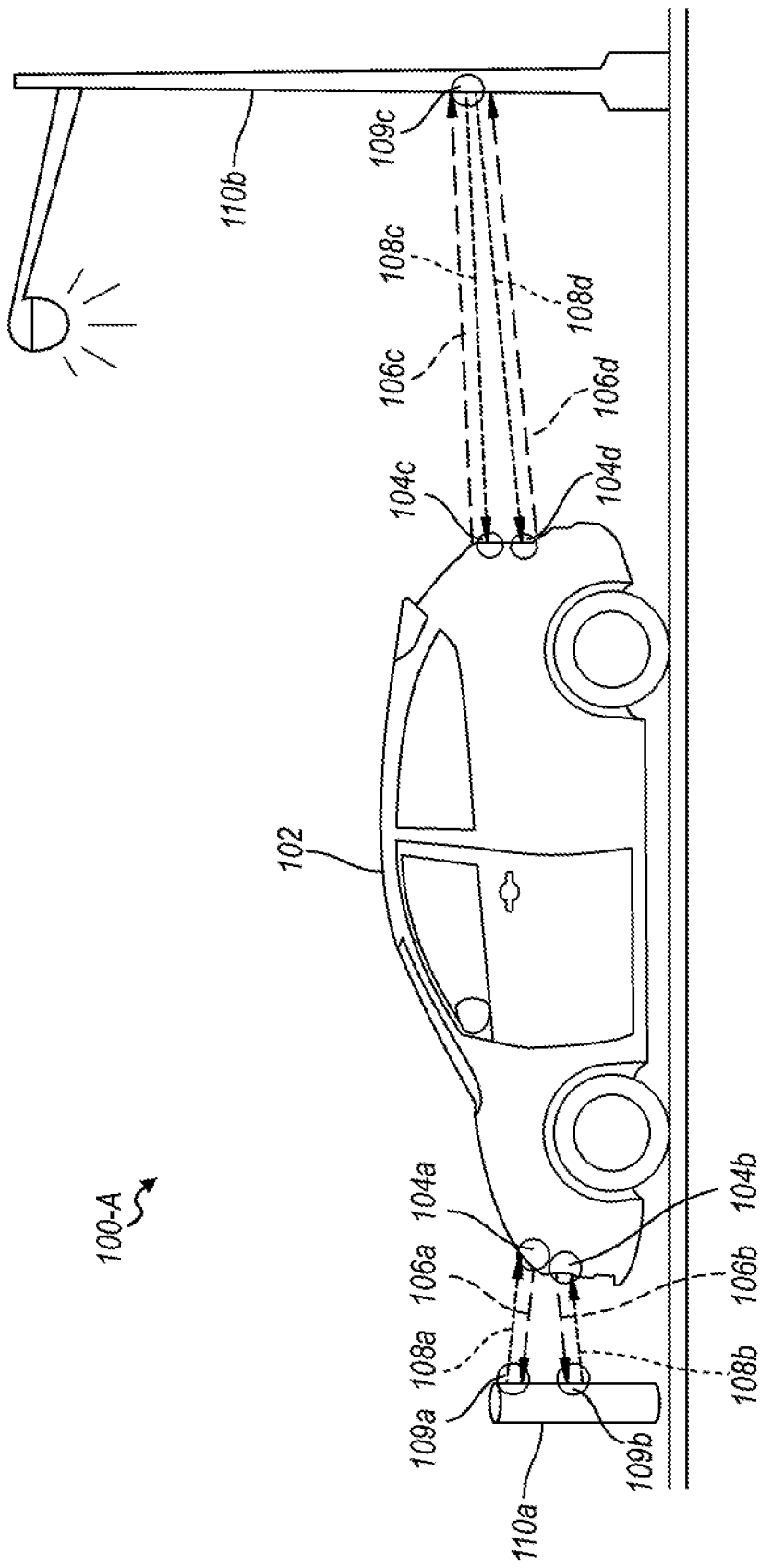
FIG. 1A is a block diagram illustrating a vehicle equipped with an ultrasonic object detection system.

FIG. 1A illustrates an example object-detection system 100-A for a vehicle 102. The vehicle 102 may be of various types of passenger vehicles, such as crossover utility vehicle (CUV), sport utility vehicle (SUV), truck, recreational vehicle (RV), boat, plane or other mobile machine for transporting people or goods.

The vehicle 102 may be equipped with a plurality of ultrasonic sensors 104. The sensors 104 may be disposed on exterior of the vehicle 102 body. Each sensor or several sensors 104 may include a housing and may be generally oriented outward and away from the vehicle 102. The sensors 104 may be oriented to send 106 and receive 108 ultrasonic signals emitted in the vicinity of the vehicle 102. In one example, the sensors 104 include an acoustic transmitter and an acoustic receiver. In some examples, other types of sensors or a combination of acoustic and other sensors may be used. In still other examples, more or fewer sensors 104 may be implemented.

The sensors 104 may be configured to send 106 and receive 108 ultrasonic signals from one or more ultrasonic sensors 109 disposed on exterior of an object 110 being detected by the vehicle 102. The object ultrasonic sensors 109 may be installed on one or more objects in public or private places, e.g., in physically constrained places or in places with poor visibility, such that the sensors 104 of the vehicle 102 may detect the location of the object 110. As one example, the sensors 104a, 104b may each send 106a, 106b and receive 108a, 108b ultrasonic signals from the object sensors 109a, 109b, respectively, when the vehicle 102 is within a predefined distance of the object 110a. As another example, the sensors 104c, 104d may both send 106c, 106d and receive 108c, 108d ultrasonic signals from the object sensor 109c, when the vehicle 102 is within a predefined distance of the object 110b.

Accordingly, ultrasonically sensing, as used herein, may include sending and receiving a positioning signal from the transmission assembly disposed on the object 110 to assist in positioning the vehicle 102 relative to the object 110. Respective signal waveforms of the sensors 104 may overlap with one another to provide greater accuracy in detection of the presence, movement and location of the object 110. The sensors 104 may emit and detect ultrasonic signals that reflect off the objects 110. Based on the sensed signals at the sensors 104, the operation of the vehicle 102 may be controlled, e.g., reducing speed of the vehicle 102 during a parking or driving maneuver, or resuming a parking or driving maneuver once a precise location of the object has been determined.

FIG. 1B illustrates an example communication system 100-B of the vehicle 102. In one example, the sensors 104 may be connected to and in communication with an ultrasonic object detection controller (hereinafter, controller) 112. The controller 112 may include one or more processors 114 connected with both a memory 116 and a computer-readable storage medium 118 and configured to perform instructions 120, commands, and other routines in support of the processes described herein.

For instance, the controller 112 may be configured to execute instructions of vehicle applications to provide features, such as, but not limited to, object detection, object identification, object movement detection, and so on. In one example, the processor 114 of the controller 112 may be configured to calculate a position of the object 110, including distance and horizontal offset, in response to signals from the sensor 104. Such instructions and other data may be maintained in a non-volatile manner using a variety of types of computer-readable storage medium 118. The computer-readable medium 118 (also referred to as a processor-readable medium or storage) includes any non-transitory (e.g., tangible) medium that participates in providing instructions or other data that may be read by the processor 114 of the controller 112. Computer-executable instructions 120 may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The controller 112 may be further configured to communicate with other components of the vehicle 102 via one or more in-vehicle networks 122. For example, the controller 112 may communicate with a first set of vehicle systems, subsystems, or components over a first in-vehicle network 122a, and with a second set of vehicle 102 systems, subsystems, or components over a second in-vehicle network 122b. In other examples, the controller 112 may be connected to more or fewer in-vehicle networks 122. Additionally or alternately, one or more vehicle 102 systems, subsystem, or components may be connected to the controller 112 via different in-vehicle networks 122 than shown, or directly, e.g., without connection to an in-vehicle network 122.

The in-vehicle networks 122 may include one or more of a vehicle controller area network (CAN), an Ethernet network, or a media oriented system transfer (MOST), as some examples. The in-vehicle networks 122 may allow the controller 112 to communicate with other vehicle 102 systems, such as a global positioning system (GPS) controller 124 and an in-vehicle display 126 configured to provide current vehicle 102 location and heading information, and various vehicle controllers 128 configured to provide other types of information regarding the systems of the vehicle 102.

As some non-limiting possibilities, the vehicle controllers 128 may include a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors, and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

The ultrasonic object detection controller 112 may be connected to and in communication with the in-vehicle display 126. The in-vehicle display may be a dashboard multifunction display or other displays as appropriate. The controller 112 may be configured to provide positional information to a driver via the in-vehicle display 126, such as, but not limited to, a position of the object 110 and a position of the vehicle 102 with respect to one another. The in-vehicle display 126 may include any appropriate representation of the vehicle 102 positional information to illustrate the vehicle 102 position and orientation, including distance and horizontal offset relative to the object 110. In response to this information, the driver may more accurately maneuver the vehicle 102 with respect to the object 110.

As one example, the vehicle 102 may be equipped with an auto park system. In such an example, a controller, which may be the controller 112 or other vehicle controllers 128, may command various vehicle systems to coordinate an automatic parking event. During an automatic parking event, vehicle steering, acceleration, and braking systems (not illustrated) may be automatically controlled to park the vehicle 102 in an appropriate parking location and orientation. The controller 112 and/or vehicle controllers 128 may use the positional information from the sensors 104 to coordinate the various systems and position the vehicle 102 relative to the objects 110.

FIG. 2A illustrates a perspective view 200-A of the ultrasonic sensor 104 of the vehicle 102. The sensor 104 may include a housing 202 configured to retain at least a portion of a connector body 204 and connection terminals 206. In some instances, the wireless transceiver 150 described in reference to FIG. 1B may be disposed within the housing 202 of the sensor 104 and may be configured to send and receive ultrasonic signals. In some other instances, the processor 114 may be connected to the wireless transceiver 150 via the terminals 206 and may monitor and control operation of the wireless transceiver 150 using the same. Additionally or alternatively, the processor 114, like the wireless transceiver 150, may be disposed within the housing 202 of the sensor 104 and may use the terminals 206 to transmit signals between the sensor 104 and the in-vehicle networks 122.

FIG. 2B illustrates a partial cross-section view 200-B of the ultrasonic sensor 104. The housing 202 may include a metal case 208. A layer of piezoelectric material 210 may be sandwiched by thin high conductivity electrode layers, e.g., layers of gold or platinum, with or without an underlying adhesion layer, e.g., a layer of chromium or titanium, and may be connected with the terminals 206. In one example, generating an excitation within one or both terminals 206 may cause the piezoelectric material 210 to deflect in a predefined pattern, such as, but not limited to, deflect in a longitudinal vibration. In some instances, thickness of the piezoelectric material 210 layer and longitudinal velocity of sound directed toward the material 210 causing corresponding vibrations may influence an anti-resonant frequency value of the sensor 104. One or more of an absorber 212, a stiffener 214, and a damper 216 may form a backing layer of the sensor 104 and may be configured to dampen vibrations of the piezoelectric material 210.

FIG. 3A illustrates an example signal transmission scheme 300-A of the ultrasonic sensor 104 signals. The vehicle 102 may include a plurality of ultrasonic sensors 104. The ultrasonic sensors 104 in communication with the controller 112 may be disposed at predefined locations about exterior of the vehicle 102, e.g., front portion of the vehicle 102, proximate to each of the vehicle 102 headlights, and so on. In one example, first, second, and third sensors 104a, 104b, 104c, respectively, may be disposed about a front bumper 302 of the vehicle 102, such that the first and third sensors 104a, 104c are located about opposite ends of the front bumper 302 and a second sensor 104b is disposed between, and equidistant from, the first and third sensors 104a, 104c.

Other variations of the above system are also contemplated. For example, the sensors 104 may be operatively coupled to a different exterior or interior portion of the vehicle 102, rather than the front bumper 302 as illustrated in FIG. 3A. In one or more variations, the sensors 104 may be operatively coupled to an underbody, sides, roof, windshield of the vehicle 102. The above and other sensor 104 locations may all be used in conjunction with methods according to the present disclosure. In some examples, the vehicle 102 may be equipped with an automatic parking system, and the positional information is used by an automatic parking system to facilitate hands-free parking. In some other examples, the vehicle 102 may be equipped with an object detection system, an adaptive cruise control system, a lane departure warning system, and so on.

The sensors 104a, 104b, 104c may be configured to emit bursts of sound at frequencies outside a range of frequencies perceptible by a human ear. For example, the controller 112 may be configured to issue a command to one or more of the sensors 104a, 104b, and 104c to generate an acoustic signal. Responsive to the command, the sensors 104a, 104b, and 104c may be configured to transmit signals simultaneously with one another or at different times. Accordingly, the sensors 104a, 104b, and 104c may transmit signals to determine whether an object is present in the vicinity of the vehicle 102 and the distance to that object.

As one example, the sensors 104a, 104b, 104c may be configured to detect an echo signal returned, e.g., reflected, from the object 110. The sensors 104 may compute the distance to the object 110 based on a period of time between the initial signal transmission and the receipt of the echo signal. In some cases, the echo signal may be lost or dissipated prior to reaching the sensor 104, such as when the echo signal is directed away from the sensor 104 due to the orientation of the object 110 relative to the sensor 104 or when the material, from which the object is made, either partially absorbs the transmitted ultrasonic signals or simply serves as a poor reflector of an ultrasonic signal waveform.

As another example, the corresponding wireless transceivers 150 of the sensors 104a, 104b, 104c may be configured to detect returned, e.g., reflected, ultrasonic signals from corresponding transceivers of the object sensors 109 disposed about the objects 110. The object sensors 109 may be disposed on one or more objects 110 likely to be within a path of a maneuvering vehicle 102, such as, but not limited to, parking meters, street and traffic signage, objects 110 located within physically constrained areas, objects 110 located in areas with poor visibility, and so on.

A distance 304 may be indicative of a shortest distance between the sensors 104 and the object sensor 109, e.g., a distance along a straight line disposed perpendicular to the plane formed by the sensors 104. A distance 306 may be indicative of a shortest distance, e.g., distance along a straight line, between the corresponding sensor 104 and the object sensor 109. Thus, a first distance 306a may be indicative of a distance between the first sensor 104a and the object sensor 109, a second distance 306b may be indicative of a distance between the second sensor 104b and the object sensor 109, a third distance 306c may be indicative of a distance between the third sensor 104c and the object sensor 109, and so on.

A distance 308 may be indicative of a distance between the outer sensors 104, i.e., the first and third sensors 104a and 104c, respectively, and the second sensor 104b may be equidistant from each of the first and third sensors 104a and 104c. In some instances, the three sensors 104a, 104b, 104c and the object sensor 109 may be arranged to form a triangle, such that a difference in respective arrival times of the ultrasonic signal, transmitted by the object sensor 109, at each of the sensors 104a, 104b, 104c may be proportional to the corresponding distance 306 between that sensor 104 and the object sensor 109.

FIG. 4 illustrates an example arrangement 400 of points A, B, and C disposed on a same plane and connected with one another to form a triangle ABC 402, where angle A defines an angle between a first line 404 connecting points A and B and a second line 406 connecting points A and C, angle B defines an angle between a pair of lines 404 and 408 connecting points B and A and points B and C, respectively, and angle C defines an angle between a pair of lines 406 and 408 connecting points C and A and points C and B, respectively. In some instances, medians $m_a$ 410, $m_b$ 412, $m_c$ 414 may be indicative of a distance between each of the points A, B, and C and the corresponding one of the points, $M_a$, $M_b$, and $M_c$ disposed about a center of an opposing side. In some other instances, the length of each of the medians $m_a$ 410, $m_b$ 412, and $m_c$ 414 may be given according to Apollonius Theorem, such that the length of each median $m_a$ 410, $m_b$ 412, and $m_c$ 414 may be based on corresponding lengths of the sides a 408, b 406, and c 404 of the triangle 402 as follows:

$$m_a = \sqrt{\frac{2b^2 + 2c^2 - a^2}{4}} \quad (1)$$

$$m_b = \sqrt{\frac{2a^2 + 2c^2 - b^2}{4}} \quad (2)$$

$$m_c = \sqrt{\frac{2a^2 + 2b^2 - c^2}{4}} \quad (3)$$

With reference to FIG. 3B, the first side, a may be indicative of the distance 308 between the first and third sensors 104a and 104c and may be known. The second distance 306b between the second sensor 104b and the object sensor 109 may be said to be the median $m_a$ 410 because the second sensor 104b is located equidistant from the first and third sensors 104a and 104c. The second and third sides b, c may be indicative of distances between one of the first and third sensors 104a and 104c and the object sensor 109.

In some instances, the distance x 304 may be indicative of a shortest distance, i.e., a length of a perpendicular line, between the object sensor 109 and the vehicle 102. The second side, b may be defined based on a sum of lengths x and y, such that $$b = x + y \quad (4)$$

where y may be indicative of a length difference between the shortest distance, x 304 and the second side, b. The third side, c may be defined based on a sum of lengths x and z, such that $$c = x + z \quad (5)$$

where z may be indicative of a length difference between the shortest distance, x 304 and the third side, c. In some examples, y may be greater than z, e.g., y>z.

Substituting values for the second and third sides b, c, expressed according to Equations (4) and (5), into Equation (1) and solving for the shortest distance, x 304 such that $$x = \frac{y^2 - 4z^2 - a^2}{4(2z - y)} \quad (6)$$

Accordingly, the values of y and z can be determined based on the speed of sound, c and a timestamping difference of the arrival of the ultrasonic pulse at each of the sensors 104. For example, the controller 112 may detect that a first timestamping time, T1 is a timestamp of the ultrasonic pulse received at the first sensor 104a, a second timestamping time, T2 is a timestamp of the ultrasonic pulse received at the second sensor 104b, and a third timestamping time, T3 is a timestamp of the ultrasonic pulse received at the third sensor 104c.

The controller 112 may be configured to compare the timestamping times T1, T2, and T3. In one example, the controller 112 may set a short timestamp $T_{SHORT}$ equal to a shortest, e.g., smallest, timestamp, set a long timestamp $T_{LONG}$ equal to a longest, e.g., largest, timestamp, and set a middle timestamp $T_{MID}$ equal to the timestamp having a value between the short and long timestamps $T_{SHORT}$ and $T_{LONG}$, respectively.

The controller 112 may be configured to determine the length y based on a difference between the short and long timestamps $T_{SHORT}$ and $T_{LONG}$ such that:

$$y = (T_{LONG} - T_{SHORT}) \times c \quad (7)$$

where c may be indicative of a speed of sound and may be approximately equal to 343 m/s. The controller 112 may be configured to determine the length z based on a difference between the short and middle timestamps $T_{SHORT}$ and $T_{MID}$ such that:

$$z = (T_{MID} - T_{SHORT}) \times c \quad (8)$$

The controller 112 may be configured to determine the shortest length, x 304 based on the values y and z, as according to Equation (6). The controller 112 may determine the second side, b and the third side, c based on Equations (4) and (5), respectively.

Figure 5A:
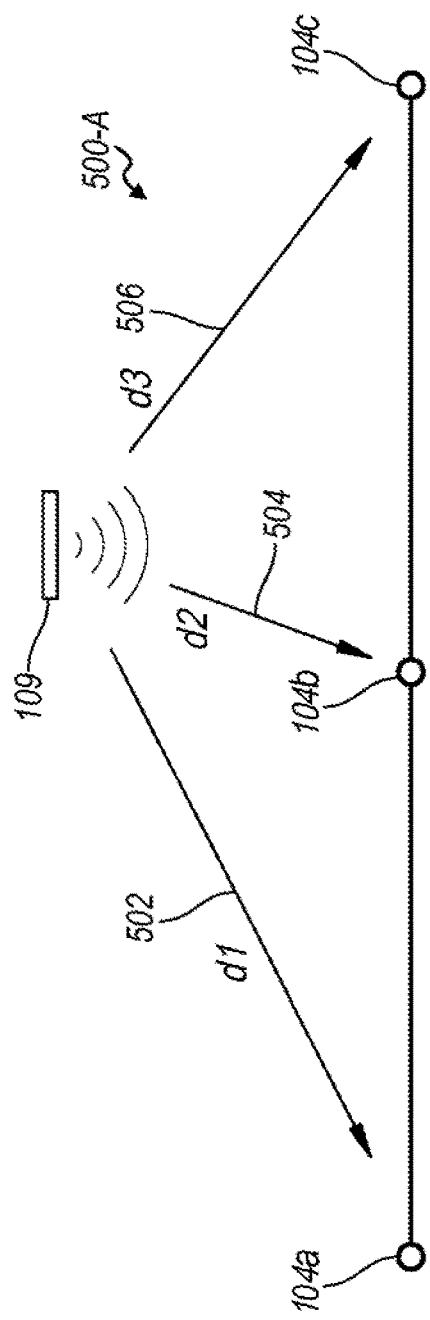
FIGS. 5A-5B are block diagrams illustrating ultrasonic sensor object positioning using triangulation.
Figure 5B:
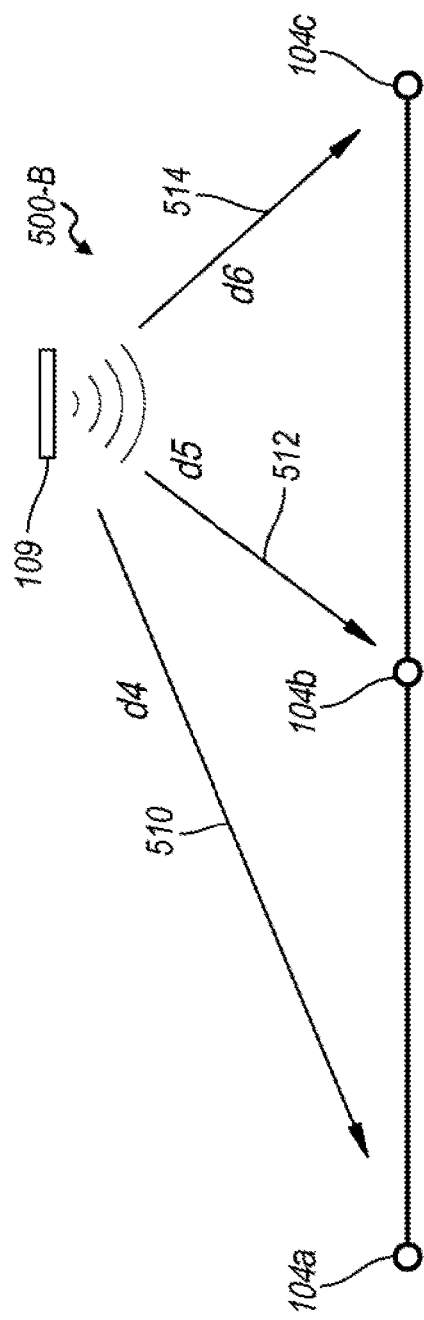

FIGS. 5A-5B illustrate example triangulation diagrams 500-A and 500-B, respectively, for varying a position of the object sensor 109 and maintaining fixed a position of the vehicle 102, i.e., ultrasonic sensors 104a, 104b, and 104c. A first pair of adjacent sensors may include the first and second ultrasonic sensors 104a, 104b and a second pair of adjacent sensors may include the second and third ultrasonic sensors 104b, 104c. In some instances, an absolute value of a difference between signal times of the sensors 104 of a given adjacent pair may be proportional to an absolute value of a difference in distance between the sensors 104 of that pair and the object sensor 109.

With reference to FIG. 5A, for the first adjacent pair, if the first sensor 104a receives the signal at t1 and the second sensor 104b receives the signal at t2, then |t1−t2| may be proportional to an absolute value of a difference between respective distances 502, 504, e.g., |d1−d2|. As another example, for the second adjacent pair, if the second sensor 104b receives the signal at t2 and the third sensor 104c receives the signal at t3, then |t2−t3| may be proportional to an absolute value of a difference between respective distances 504, 506, e.g., |d2−d3|.

Referring now to FIG. 5B, for the first adjacent pair, if the first sensor 104a receives the signal at t1 and the second sensor 104b receives the signal at t2, then |t1−t2| may be proportional to an absolute value of a difference between respective distances 510, 512, e.g., |d4−d5|. As another example, for the second adjacent pair, if the second sensor 104b receives the signal at t2 and the third sensor 104c receives the signal at t3, then |t2−t3| may be proportional to an absolute value of a difference between respective distances 512, 514, e.g., |d5−d6|.

Figure 6B:
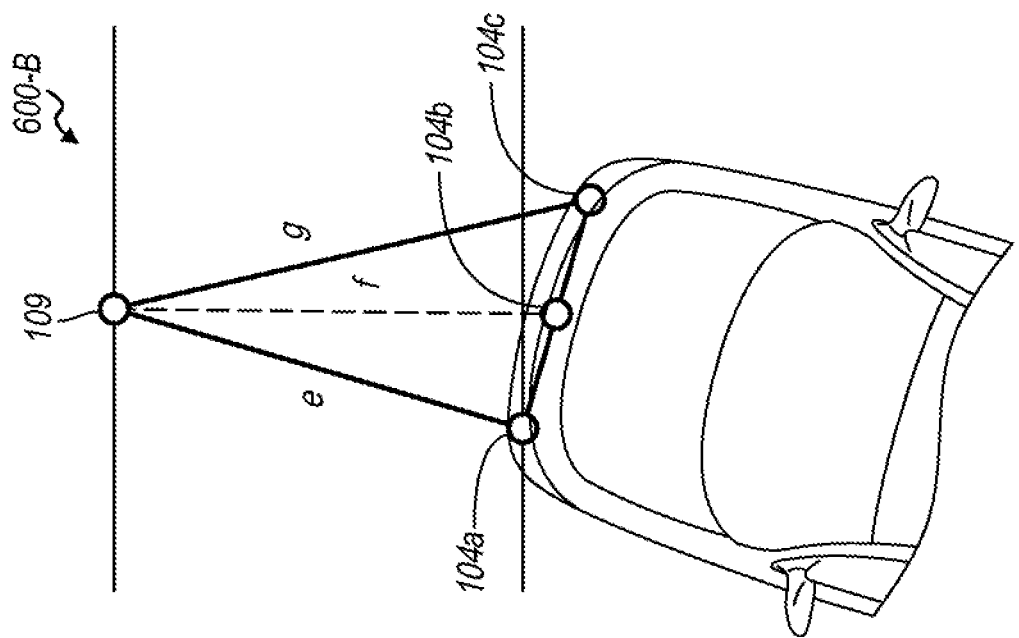
FIGS. 6A-6B are block diagrams illustrating object location determination using ultrasonic sensor signal triangulation.
Figure 6A:
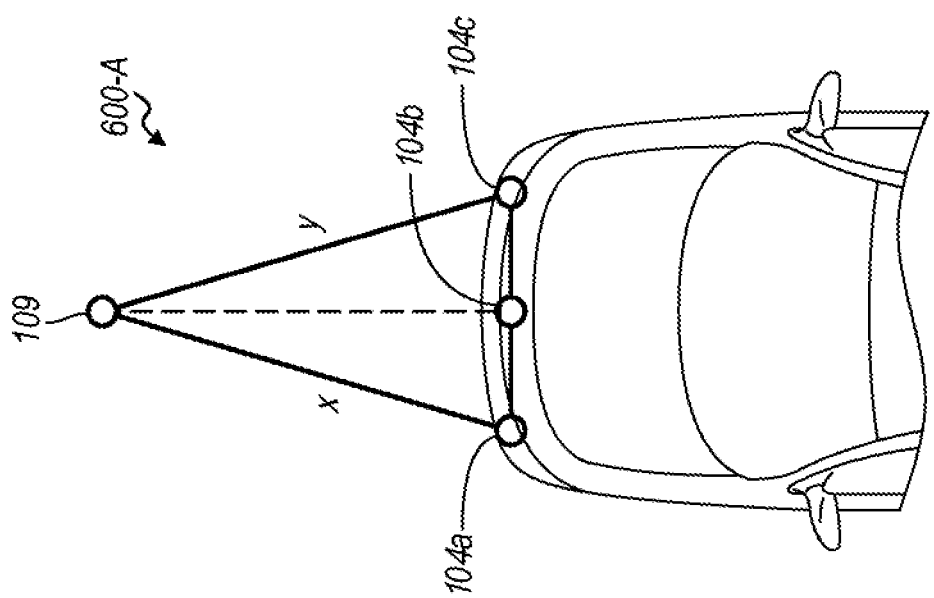

FIGS. 6A-6B illustrate example triangulation diagrams 600-A and 600-B, respectively, for varying a position of the vehicle 102, i.e., a position of the ultrasonic sensors 104a, 104b, and 104c and keeping fixed a position of the object sensor 109. In one example, if arrival timestamps T of at least two sensors 104 are approximately equal, then the respective distances d between the object sensor 109 and those sensors 104 may be approximately equal to one another. With reference to FIG. 6A, distance x between the first sensor 104a and the object sensor 109 may be approximately equal to distance y between the third sensor 104c and the object sensor 109 when respective differences between associated signal timestamps T of the pairs of adjacent sensors 104 are approximately equal to one another, e.g., (T1−T2)≈(T3−T2).

As still another example, differences between a shortest (or smallest value) signal timestamp $T_{SHORT}$ and each of a medium signal timestamp $T_{MID}$ and a longest (or largest value) signal timestamp $T_{LONG}$ may be proportional to differences in distance between the sensors 104 associated with the shortest, middle, and longest timestamps $T_{SHORT}$, $T_{MID}$, and $T_{LONG}$, respectively, and the object sensor 109.

With reference to FIG. 6B, a shortest signal timestamp $T_{SHORT}$ may be associated with the first sensor 104a, a medium signal timestamp $T_{MID}$ may be associated with the second sensor 104b, and a longest (or largest value) signal timestamp $T_{LONG}$ may be associated with the third sensor 104c. Accordingly, ($T_{MID}-T_{SHORT}$) may be proportional to a difference between distance e of the first sensor 104a and the object sensor 109 and distance f of the second sensor 104b and the object sensor 109. Additionally or alternatively, ($T_{LONG}-T_{SHORT}$) may be proportional to a difference between distance f of the second sensor 104b and the object sensor 109 and distance g of the third sensor 104c and the object sensor 109.

Figure 7A:
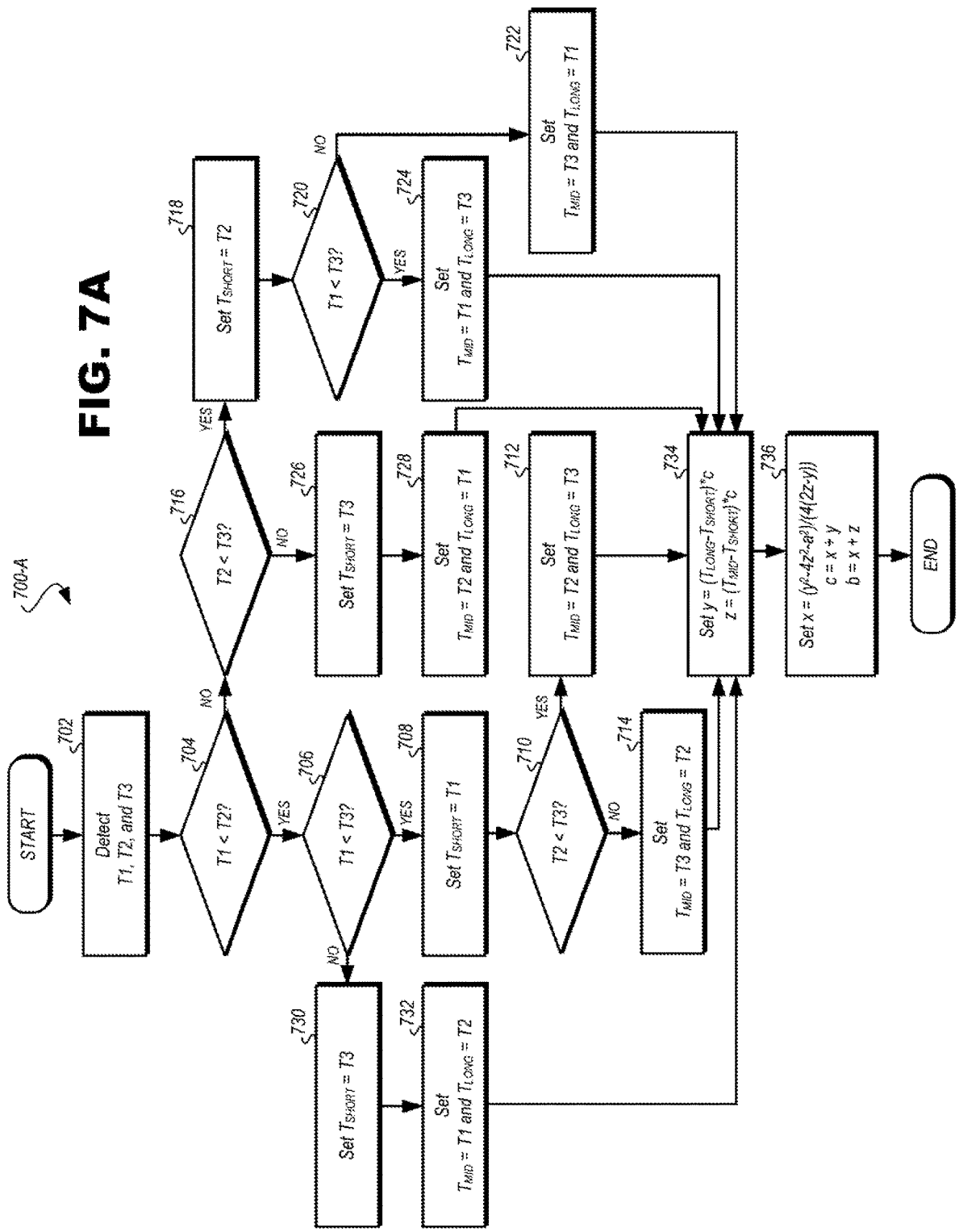
FIGS. 7A-7B are flowcharts illustrating algorithms for the ultrasonic object detection system.

FIG. 7A illustrates an example process 700-A for determining a position of the object 110 with respect to the vehicle 102 using triangulation. The process 700-A may begin at block 702 where the controller 112 detects timestamps T1, T2, and T3 associated with a same signal emitted by a transceiver associated with object sensor 109 and received by the first, second, and third sensors 104a, 104b, and 104c, respectively. At one or more of blocks 704-732 the controller 112 may compare values of the timestamps T1, T2, and T3 with one another and set a shortest (or smallest value) timestamp equal to $T_{SHORT}$, a longest (or largest value) timestamp equal to $T_{LONG}$, and a middle (or medium value) timestamp equal to $T_{MID}$, such that each timestamp T1, T2, and T3 is associated with only one of $T_{SHORT}$, $T_{LONG}$, and $T_{MID}$.

The controller 112 at block 734 may determine values y and z according to Equations (7) and (8), respectively. At block 736 the controller 112 may determine a shortest distance x based on the values y and z, where the distance x may be indicative of a shortest distance between the sensors 104a, 104b, 104c and the object sensor 109 and/or indicative of a height of a triangle formed between the sensors 104a, 104b, 104c and the object sensor 109. In one example, the controller 112 may determine the shortest distance x based on the values y and z and a distance a between the nonadjacent sensors 104, e.g., distance between the first and third sensors 104a, 104c, as described, for example, in reference to Equation (6). Additionally or alternatively, the controller 112 at block 736 may determine sides b and c of the triangle formed between the sensors 104a, 104b, 104c and the object sensor 109, as described, for example, in reference to Equations (4) and (5), respectively.

Figure 7B:
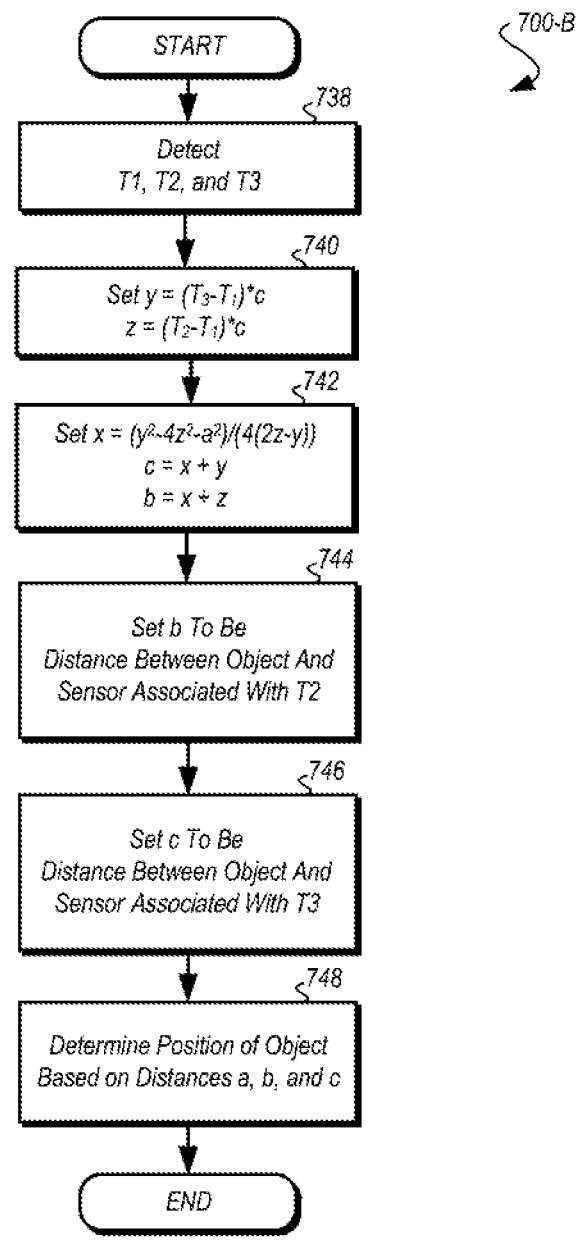

FIG. 7B illustrates an example process 700-B for determining a position of the object 110 with respect to the vehicle 102 using triangulation. In some instances, the controller 112 may complete the process 700-B instead of completing the process 700-A or vice versa. In some other instances, the controller 112 may complete portions of the process 700-B prior to and/or after completing portions of the process 700-A.

The process 700-B may begin at block 738 where the controller 112 detects timestamps T1, T2, and T3, each received by one of the first, second, and third sensors 104a, 104b, and 104c, where T3 is a longest (or largest in value) timestamp, T2 is a middle (or medium value) timestamp, and T1 is a shortest (or smallest value) timestamp. At block 740, the controller 112 may determine differences y and z, such that:

$$y=(T3-T1)\times c \qquad (9)$$

and $$z=(T2-T1)\times c, \qquad (10)$$

where c is a representative of a speed of sound and may be approximately equal to 343 m/s.

At block 742 the controller 112 may determine a shortest distance x based on the values y and z, where the distance x may be indicative of a shortest distance between the sensors 104a, 104b, 104c and the object sensor 109 and/or indicative of a height of a triangle formed between the sensors 104a, 104b, 104c and the object sensor 109. In one example, the controller 112 may determine the shortest distance x based on the values y and z and a distance a between the first and third sensors 104a, 104c, as described, for example, in reference to Equation (6). Additionally or alternatively, the controller 112 at block 742 may determine sides b and c of the triangle formed between the sensors 104a, 104b, 104c and the object sensor 109, as described, for example, in reference to Equations (4) and (5), respectively.

At block 744 the controller 112 may set distance b to a distance between the object 110 and the sensor 104 associated with the timestamp T2. In one example, the controller 112 may be configured to, responsive to detecting at block 738 the timestamps T1, T2, and T3, associate each sensor 104 with one of the timestamps T1, T2, and T3 based on the timestamp at which the return signal is received at that sensor 104. At block 746 the controller 112 may set distance c to a distance between the object 110 and the sensor 104 associated with the timestamp T3. The controller 112 at block 748 may determine position of the object 110 based on the distances a, b, and c. That is, the controller 112 may determine the position of the object 110 without any data as to when the signal output by the object sensor 109 was sent.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
a trio of ultrasonic sensors; and
a controller configured to, responsive to a location of an object identified from a distance between the trio of ultrasonic sensors, a receive time at each of the ultrasonic sensors associated with a same ultrasonic pulse from a transceiver of the object, and an absence of data regarding a send time of the ultrasonic pulse, steer the vehicle to the object.

2. The system of claim 1, wherein the ultrasonic sensors are equally spaced relative to one another.

3. The system of claim 2, wherein the ultrasonic sensors are linearly disposed relative to one another.

4. The system of claim 3, wherein the distance between the ultrasonic sensors is between the ultrasonic sensors not adjacent to one another.

5. The system of claim 1, wherein the receive times define a difference between the receive times of a pair of the ultrasonic sensors adjacent to one another.

6. The system of claim 5, wherein the difference between the receive times of the pair is proportional to a difference between distances from each of the pair to the object.

7. The system of claim 1, wherein the receive times are defined by timestamps recorded when the ultrasonic pulse is received at the ultrasonic sensors.

8. A method for a vehicle comprising:
steering, by a controller, the vehicle to an object responsive to a location of the object being identified from a distance between an outer pair of a trio of ultrasonic sensors on the vehicle, a receive time at each of the ultrasonic sensors associated with a same ultrasonic pulse from a transceiver of the object, and an absence of data regarding a send time of the ultrasonic pulse.

9. The method of claim 8 further comprising recording timestamps associated with the ultrasonic pulse to define the receive times.

10. The method of claim 8, wherein the receive times define a difference between the receive times of an adjacent pair of the ultrasonic sensors.

11. The method of claim 10, wherein the difference between the receive times of the adjacent pair is proportional to a difference between distances from each of the adjacent pair to the object.

12. The method of claim 8, wherein the ultrasonic sensors are equally spaced relative to one another.

13. The method of claim 12, wherein the ultrasonic sensors are linearly disposed relative to one another.

14. A vehicle comprising:
a bumper having a trio of sensors thereon; and
a controller configured to steer the vehicle to an object based on a location of the object identified from receive times at each of the trio of sensors associated with a same pulse emitted from the object and an absence of data regarding a send time of the pulse.

15. The vehicle of claim 14, wherein the location is further identified from a distance between the sensors.

16. The vehicle of claim 14, wherein the sensors are ultrasonic sensors.

17. The vehicle of claim 14, wherein the sensors are equally spaced relative to one another.

* * * * *